(12) United States Patent
Ravaud

(10) Patent No.: US 11,128,186 B2
(45) Date of Patent: Sep. 21, 2021

(54) ELECTROMAGNETIC MOTOR OR GENERATOR COMPRISING A ROTOR WITH MAGNETIZED STRUCTURES COMPRISING INDIVIDUAL MAGNETS AND A STATOR WITH CONCENTRIC WINDINGS

(71) Applicant: WHYLOT SAS, Cambes (FR)

(72) Inventor: Romain Ravaud, Labastide-Murat (FR)

(73) Assignee: Whylot SAS, Cambes (FR)

( * ) Notice: Subject to any disclaimer, the term of this patent is extended or adjusted under 35 U.S.C. 154(b) by 114 days.

(21) Appl. No.: 16/494,994

(22) PCT Filed: Mar. 20, 2018

(86) PCT No.: PCT/FR2018/000062
§ 371 (c)(1),
(2) Date: Sep. 17, 2019

(87) PCT Pub. No.: WO2018/172633
PCT Pub. Date: Sep. 27, 2018

(65) Prior Publication Data
US 2020/0028393 A1    Jan. 23, 2020

(30) Foreign Application Priority Data

Mar. 22, 2017  (FR) ........................... 1700295
Dec. 1, 2017   (FR) ........................... 1701268

(51) Int. Cl.
*H02K 3/46*      (2006.01)
*H02K 1/27*      (2006.01)
(Continued)

(52) U.S. Cl.
CPC ......... *H02K 1/2793* (2013.01); *H01F 7/0221* (2013.01); *H01F 41/0253* (2013.01);
(Continued)

(58) Field of Classification Search
CPC ........... H02K 3/46; H02K 7/003; H02K 21/12
(Continued)

(56) References Cited

U.S. PATENT DOCUMENTS 5,619,087 A    4/1997  Sakai
8,680,736 B2 *  3/2014  Wang ................... H02K 21/24
                                               310/216.045
(Continued)

FOREIGN PATENT DOCUMENTS

EP    0996212    4/2000
EP    1624555    2/2006
(Continued)

OTHER PUBLICATIONS

International Search Report dated May 30, 2018 from International Application No. PCT/FR2018/000062.
(Continued)

*Primary Examiner* — Terrance L Kenerly
(74) *Attorney, Agent, or Firm* — Crockett & Crockett, PC; K. David Crockett, Esq.; Niky Economy Syrengelas, Esq.

(57) ABSTRACT

A motor or electromagnetic generator with a rotor (3) and at least one stator (1, 2), the rotor (3) having permanent magnets (12) rotating around a median shaft and the stator (1, 2) having windings (5). The rotor (3) comprises magnet structures forming magnet poles composed of a plurality of unit magnets (15), covering discs (17) being axially arranged on each of two opposite axial faces of the rotor (3), the covering discs (17) being made of a composite material, the covering discs (17) and the magnet structures (12) being coated in an outer coating layer of composite material defining the outer contour of said at least one rotor (3). The stator (1, 2) comprises concentric windings (5) comprising a series of blocks (4) with the windings (5) wound around
(Continued)

each block (4), the blocks (4) being rigidly attached to each other.

13 Claims, 2 Drawing Sheets

(51) Int. Cl.

| | | |
|---|---|---|
| *H02K 21/12* | (2006.01) | |
| *H02K 1/02* | (2006.01) | |
| *H02K 15/03* | (2006.01) | |
| *H02K 21/24* | (2006.01) | |
| *H02K 41/03* | (2006.01) | |
| *H02K 1/12* | (2006.01) | |
| *H02K 5/04* | (2006.01) | |
| *H01F 7/02* | (2006.01) | |
| *H01F 41/02* | (2006.01) | |
| *H02K 1/04* | (2006.01) | |
| *H02K 1/28* | (2006.01) | |
| *H02K 15/12* | (2006.01) | |
| *H02K 16/04* | (2006.01) | |
| *H02K 7/00* | (2006.01) | |

(52) U.S. Cl.
CPC .................. *H02K 1/02* (2013.01); *H02K 1/04* (2013.01); *H02K 1/12* (2013.01); *H02K 1/27* (2013.01); *H02K 1/28* (2013.01); *H02K 3/46* (2013.01); *H02K 5/04* (2013.01); *H02K 15/03* (2013.01); *H02K 15/12* (2013.01); *H02K 16/04* (2013.01); *H02K 21/12* (2013.01); *H02K 21/24* (2013.01); *H02K 41/031* (2013.01); *H01F 7/021* (2013.01); *H02K 7/003* (2013.01)

(58) Field of Classification Search
USPC ...................................................... 310/156.01
See application file for complete search history.

(56) References Cited

U.S. PATENT DOCUMENTS

| | | |
|---|---|---|
| 2011/0285237 A1 | 11/2011 | Amari et al. |
| 2013/0146453 A1 | 6/2013 | Foo |

FOREIGN PATENT DOCUMENTS

| | | |
|---|---|---|
| EP | 1780878 | 5/2007 |
| EP | 1982403 | 10/2008 |
| EP | 2043230 | 4/2009 |
| EP | 2306619 | 4/2011 |
| EP | 2333935 | 6/2011 |
| EP | 2773023 | 9/2014 |
| FR | 1475501 | 3/1967 |
| FR | 2996378 | 4/2014 |
| FR | 3014255 | 6/2015 |
| JP | 10121236 | 5/1998 |
| JP | 2005341696 | 12/2005 |
| JP | 2015202514 | 11/2015 |
| WO | WO2016116678 | 7/2016 |

OTHER PUBLICATIONS

International Search Report dated Jun. 13, 2018 from International Application No. PCT/FR2018/000063.

International Search Report dated Jun. 12, 2018 from International Application No. PCT/FR2018/000064.

International Search Report dated Jun. 12, 2018 from International Application No. PCT/FR2018/000066.

* cited by examiner

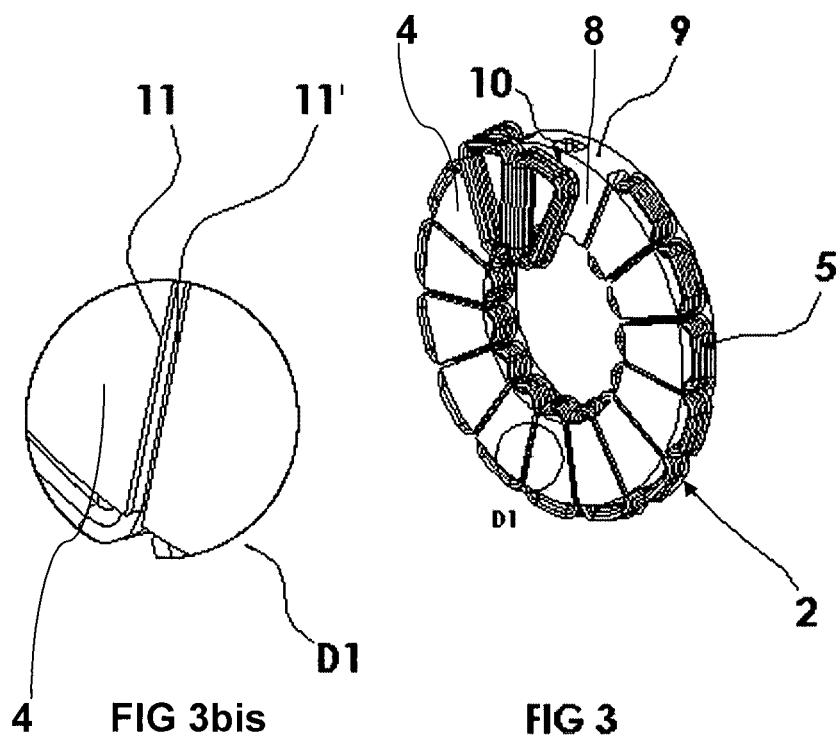
FIG 3bis  FIG 3
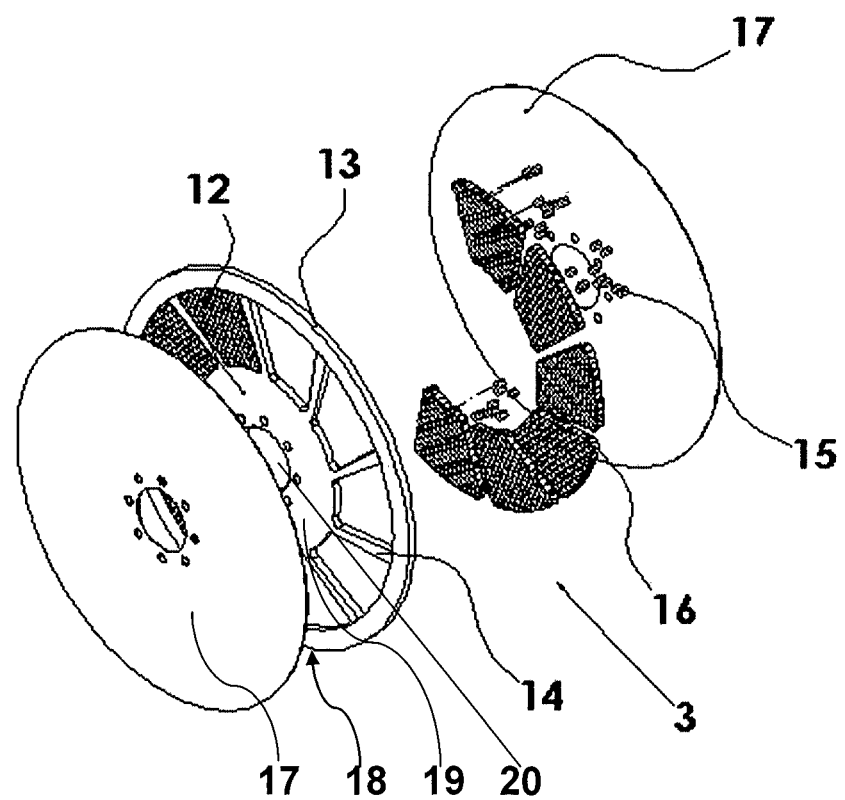
FIG 4

ELECTROMAGNETIC MOTOR OR GENERATOR COMPRISING A ROTOR WITH MAGNETIZED STRUCTURES COMPRISING INDIVIDUAL MAGNETS AND A STATOR WITH CONCENTRIC WINDINGS

FIELD OF THE INVENTIONS

The invention relates to an electromagnetic motor or generator comprising at least one rotor with magnetized structures comprising individual magnets and at least one stator with concentric windings.

BACKGROUND

This invention is advantageously but not restrictively applied to an electromagnetic motor that delivers high power with a high speed of rotation of the rotor, which is achieved as a result of the specific characteristics of the rotor according to this invention in interaction with the specific characteristics of the stator or stators. A motor or generator of this type can be used, for example, as an electromagnetic motor in a fully electric or hybrid automotive vehicle.

Advantageously but not restrictively, the electromagnetic motor or generator can comprise at least one motor bordered by two stators, whereby these components can be superimposed on one another and be separated by at least one air gap on the same shaft.

In high-speed applications, it is necessary to have not only a compact system made possible by the reduction of the weight and size of the axial motor for optimal performance, but also a very effective retention of the rotating part, i.e. the rotor or rotors, to improve the reliability of the system but also of the stator or stators.

In high-speed applications it is necessary to reduce losses for optimal performance. Miniaturization is an increasingly desirable objective in automotive applications. To do that, it is important to have a compact system made possible by the reduction of the weight and size of the axial motor but also a very effective mechanical retention of the rotating part to improve the reliability of the system.

For an axial flux electromagnetic machine, the rotor comprises a body in the form of a disc that has two circular faces connected by a thickness, the disc being delimited between an outer ring and an inner periphery delimiting an empty space for a rotating shaft.

At least two permanent magnets are applied against at least one of the two circular faces of the body, which is called a support face. For a rotor with a single air gap designed to be associated with the stator, a single circular surface of the body carries magnets while for a rotor with two air gaps with a respective stator, it is the two faces that carry the magnets.

The magnets are each held on the face or their respective face by holding means, an interval being left between the at least two magnets on the same face.

The stator or each stator carry winding elements comprising a tooth that carries a coil, the tooth being bordered on each of its sides by a notch, whereby a metal wire made of a metal that is a good conductor is wound around the tooth to form each winding.

When the single or multiple series of windings are supplied with electricity, the rotor which is attached to the output shaft of the motor is subjected to a torque originating from the magnetic field, whereby the magnetic flux created is an axial flux for an axial flux electromagnetic machine and a radial flux for a radial flux machine.

For a high-power motor, the rotor rotates at high speeds of rotation. The principal disadvantage of a motor with a high speed of rotation resides in the high probability of a detachment of the magnet or magnets from the rotor as well as the at least partial breakage of the rotor. The rotor of a motor of this type must therefore be capable of withstanding high speeds of rotation.

Prior art document EP-B-1 203 436 describes an axial flux electrical machine with a core-less rotor in the form of a disk arranged on a machine shaft and having permanent magnets that are embedded in a plastic material reinforced by fibers or textile and with a respective stator on either side of the rotor.

The permanent magnets are respectively assembled in a positive engagement with the fiber-reinforced or textile-reinforced material that surrounds them. The shaft of the machine, with two flanges of this machine shaft, is attached in a stable manner to the rotor only by the plastic material. The plastic material, together with the permanent magnets and the machine shaft, forms a dimensionally stable assembly.

This prior art document therefore proposes to create with plastic material an assembly all in one piece composed of the rotor and its rotation shaft. However, it is known that an assembly of this type can be subjected to stresses between the rotor and its shaft that can lead to a rupture of the assembly. A design of this type therefore weakens the assembly.

Moreover, on account of the large magnets used for the rotor in this prior art document, a rotor of this type dissipates a large amount of heat. This dissipation makes it impossible to use axial holding means in the form of composite covering discs, and the dissipation of heat can have consequences on the integrity of the coating resulting in an accelerated aging of both this coating and the magnets.

Prior art document US-A-2011/0285237 describes an axial air gap motor.

The object of this document is to simplify the steps in the fabrication of the rotor while preventing the permanent magnets carried by this rotor from being displaced or unscrewed during the assembly, installation and operation of the rotor. The magnets are housed in a one-piece structure made of a molded part surrounding the magnets.

The molded part has grooves separating the magnets into which ribs on a body of the rotor are introduced, which makes it possible to lock the molded part to prevent an axial displacement movement. A radial hold of the molded part is achieved by inner and outer concentric elements on the molded part.

The subject matter of this prior art document is therefore magnets that are housed in a molded part and it contains no teaching with regard to magnets that are separated from one another. Moreover, the ribs hold the magnets only by their action on the molded part and therefore not by directly holding the magnets in the rotor.

According to these two prior art documents, at the level of the rotor, the only improvement of the magnetization force is achieved by the use of increasingly expensive permanent magnets. The innovation efforts of the prior art relate to the stator portion of the motor or of the generator, which is translated by the design of increasingly sophisticated and therefore increasingly expensive stators that are difficult to assemble.

Prior art document EP-A-1 780 878 describes a three-dimensional magnet structure constituted by a plurality of individual magnets, whereby the magnet structure has a thickness that forms its smallest dimension, the structure includes at least one mesh structure that has meshes that each define a housing for a respective individual magnet, each housing has inside dimensions that are just sufficient to allow the introduction of an individual magnet into its interior and the mesh structures are made of fiber-reinforced insulating material.

However, a magnet structure of this type is not capable of withstanding high speeds of rotation when the magnet structure or structures are carried by a rotor.

Prior art document FR-A-2 996 378 describes a magnet structure comprising individual magnets. These individual magnets are adhesively attached by resin without the interposition of any holding element between the individual magnets. An arrangement of this type could not withstand high speeds of rotation without losing magnets during the rotation.

The problem addressed by the present invention is to design an electric axial flux motor or generator that can have, on one hand, a rotor part with a lower quantity of heat emitted and reduced rotor losses, and on the other hand a stator part specifically adapted to take into consideration the modifications made in the rotor portion.

SUMMARY

For this purpose, the present invention relates to an electromagnetic motor or generator comprising at least one rotor and at least one stator, said at least one rotor comprising permanent magnets that rotate around a median shaft, and said at least one stator comprising windings, characterized in that said at least one rotor comprises magnet structures forming magnet poles, each magnet structure being composed of a plurality of individual magnets, whereby covering discs are positioned axially on each of the two opposite axial faces of the at least one rotor, the covering discs are made of a composite material, the covering discs and the magnet structures are coated in an outer coating layer of composite material defining the outer contour of the at least one rotor, and in that the stator comprises concentric windings comprising a series of blocks with windings wound around each block, the blocks (4) being rigidly attached to each other.

One of the principal objectives of the present invention is to replace one or more large magnets with a plurality of small magnets. A magnetic flux is therefore created by a multitude of small magnets, of which there can be at least 20 and even more than 100 per magnet pole. A rotor of the prior art can comprise from 1 to 10 magnets while the present invention provides many more small magnets in each magnet structure.

A clear distinction must be made between a magnet structure, a rotor that can carry, for example, from five to ten or even more magnet structures, and individual magnets that are significantly more numerous, whereby a rotor can carry several hundred individual magnets, for example. The small individual magnets according to the present invention can be inserted into the respective cells by a robot.

This makes it possible to obtain a rotor which, among other advantages, can rotate at high speed and has no core, which limits rotor losses.

According to the invention, it has been discovered that a plurality of individual magnets results in a magnet structure that is more resistant to the overall level of flexing of the rotor while generating very little heat on account of the low losses generated, whereby the heat dissipated by the individual magnets is less than the heat dissipated by a corresponding larger one-piece magnet.

The magnet structure comprises a layer of non-conducting composite material coating the individual magnets and the mesh. Moreover, its mechanical strength can be high and the coating can easily be applied, in particular by injection of the composite over an arrangement of individual magnets held in place in relation to one another by any means.

With a rotor of this type, it is advantageous to associate one or more stators that have iron teeth with concentric windings, which is easy to do.

The present invention accomplishes the inverse of the procedure followed by many manufacturers of motors and electromagnetic generators. It is known that innovation efforts can be applied to stators by designing windings that are increasingly complex and difficult to design.

Conversely, the inventive approach taken by the present invention relates principally to a coreless rotor that is coated with a composite and contains magnet structures, each of which is made of a plurality of magnets. This approach has made it possible to use a concentric winding for the stator or stators, although a concentric winding of this type would not be altogether satisfactory with one-piece permanent magnets of the type used in the closest prior art.

It turns out that the utilization of an association of this type of a composite rotor with at least one iron stator comprising iron teeth or blocks and a concentric winding for the stator creates synergy with regard to the power of the motor or of the generator used as well as the ease of fabrication and the mechanical strength of the motor or the generator.

It is possible to use different types of materials for the individual magnets, selected for example from the samarium-cobalt (Sm—Co) alloys, aluminum, nickel and cobalt alloys, hard ferrites and neodymium-iron-boron materials, the important thing being that these materials can be machined into blocks with a small width or small diameter compared to their length.

Each magnet structure forming a magnet pole advantageously comprises more than twenty individual magnets, whereby the individual magnets are connected by a resin that separates them or are each inserted in a respective housing delimited by one of the mesh elements of a mesh.

The mesh, which is advantageously made of a composite material, holds the individual magnets in place, which contributes to the strength of the rotor. The rotor with magnets located in the cells of the present invention is designed to reduce the losses in the rotor with rigid attachment means that make it possible to hold the magnets and to reduce the effect of the axial or radial force and of the centrifugal force at very high speeds.

Compared to the prior art illustrated by document US-A-2011/0285237, the rotor according to the invention is suitable for use with magnets that are not directly attached among themselves, while in the prior art document the magnets are housed in a molded piece that forms the support structure. The present invention therefore offers a solution that is suitable for any type of arrangement of the magnets on the rotor.

The molded part of the prior art can be subject to local ruptures because it is stressed by a plurality of ribs. That is not the case with a cell structure which is known for its mechanical strength. The cell structure can be in the form of a honeycomb but the important thing is that the cells hold small magnets.

The combination of the shapes of the magnets and the holding means for the magnets realized only by a coating of composite material makes it possible to reduce losses in the rotor and therefore heating, and to minimize the risk of de-magnetization of the magnets.

The magnet structures are advantageously individually coated with an inner composite layer, in which case the magnet structures are located directly adjacent to one another concentric to the median shaft of the at least one rotor, or the magnet structures are arranged concentric to the median shaft, leaving a space between them which is filled by parts of the outer coating layer.

Therefore it can have at least two successive coatings, contributing to the solidity of the rotor, a coating of the magnet structure that also surrounds the individual magnets and a coating of the assembly of magnet structures.

At least the outer coating layer and the covering discs are fiber-reinforced. The presence of fibers increases the mechanical strength of the rotor.

The fibers of the outer coating layer and the fibers of the covering discs are advantageously oriented in different directions. The covering discs make it possible to strengthen the axial hold of the magnets. Composite covering discs are infrequently used in the prior art because they cannot withstand dissipation of the heat generated by the magnets.

Because this invention uses a multitude of individual magnets, replacing a compact magnet of the prior art, the dissipation of heat is less and covering discs can be used as axial holding means, whereby these discs advantageously replace axial holding means between magnets and the rotor body, which may require modifications of the magnets or of their coating to achieve additional fastening means with the fastening means carried by the rotor.

The outer coating layer and the covering discs are advantageously reinforced with fibers oriented in a plurality of directions.

A binding band made of composite material advantageously surrounds the magnet structures circumferentially on an exterior periphery of the at least one rotor, whereby the outer coating layer also coats the binding band.

The binding band contributes, if necessary, to the radial holding of the magnets in addition to the hold guaranteed by the outer composite coating layer.

The binding band is advantageously part of a composite armature comprising a hub concentric to the median shaft, whereby branches extend between the hub and the binding band, and each branch separates two adjacent magnet structures. This mode of construction is merely optional. No or very little holding action is provided by the branches on the magnet structures, whereby the branches act principally to hold the binding band on the rest of the rotor.

The blocks of the at least one stator are advantageously individual units and each has first and second surfaces joined by a thickness, the first quadrangular surfaces of the blocks on one hand and the second quadrangular surfaces of the blocks on the other hand being aligned in a respective radial plane in the assembled position of the at least one stator in the motor or the generator, the windings being wound around the thickness.

The blocks of the at least one stator are made of iron.

The blocks advantageously each have first and second quadrangular surfaces joined by a thickness, whereby the first quadrangular surfaces of the blocks on the one hand and the second quadrangular surfaces of the blocks on the other hand are aligned in a respective radial plane in the assembled position of the at least one stator in the motor or the generator, whereby the coils are wound around the thickness.

The first quadrangular surfaces on the one hand and the second quadrangular surfaces on the other hand are advantageously respectively placed end to end, whereby the blocks form a ring concentric to the median shaft.

A notch advantageously extending in a radial plane surrounds the thickness of each block for the housing of the windings around the block.

Each block is advantageously composed of a stack of metal sheets.

Each block advantageously has a median tapped boring that runs through it, removable fastening means that connect each block individually to a support ring applied against the blocks, or each block is attached by permanent or removable fastening means to the two blocks that are adjacent to it.

The motor or the generator advantageously comprises at least one rotor surrounded by two stators, whereby the two stators enclose the at least one rotor between them.

The motor or generator is advantageously an axial flux motor or generator.

BRIEF DESCRIPTION OF THE DRAWINGS

Additional characteristics, objectives and advantages of the present invention are described in greater detail below and with reference to the accompanying drawings which are provided merely by way of non-restricting examples and in which:

FIGS. 3 and 3bis are schematic illustrations of a view in perspective for FIG. 3 from another angle than the one shown in FIG. 2 of the stator which is part of an electromagnetic motor or generator according to one embodiment of the present invention, whereby two windings are shown at some distance from the blocks on which the windings are respectively wound, and FIG. 3bis shows an enlarged view of the adjacent edges of the two blocks, FIG. 4 is a schematic representation of an exploded view in perspective of an electromagnetic motor or generator according to one embodiment of the present invention, whereby the rotor comprises a composite armature that has an inner hub and an outer binding band connected by branches separating the magnet structures comprising a plurality of individual magnets, whereby each of them forms a magnet pole.

Figure 1:
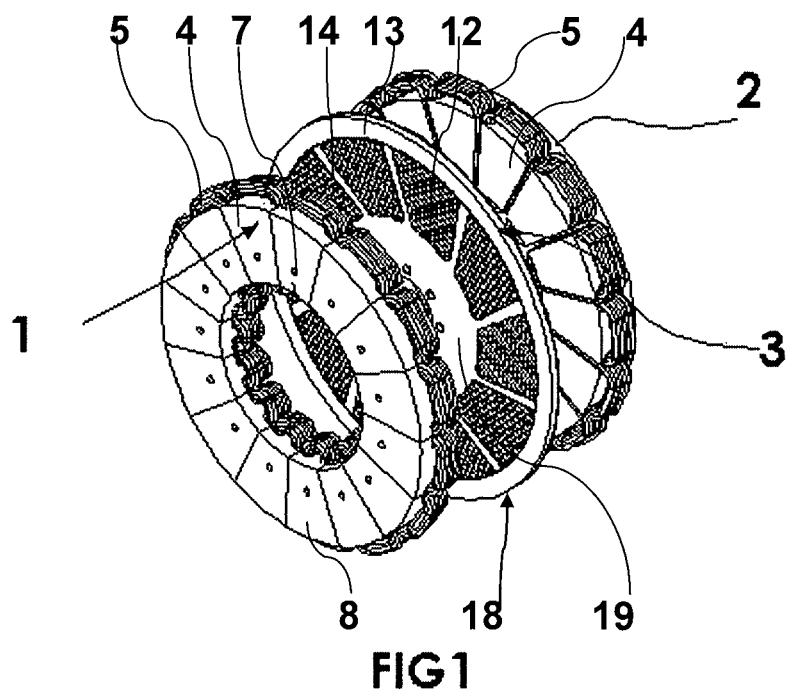
FIG. 1 is a schematic illustration of a perspective view of a rotor fixed between two stators, whereby the rotor and the stators are shown at some distance from one another and having the characteristics respectively of a rotor and a stator appropriate to an electromagnetic motor or generator according to one embodiment of the present invention, whereby the magnetic structures forming the magnet poles are composed of individual magnets.

The illustrations are presented by way of example and in no way restrict the invention. They constitute schematic representations intended to facilitate an understanding of the invention and are not necessarily drawings to scale of practical applications. In particular, the dimensions of the different parts are not representative of reality.

DETAILED DESCRIPTION OF THE INVENTIONS

With reference to all the Figures, the present invention relates to an electromagnetic motor or generator comprising at least one rotor 3 and at least one stator 1, 2.

The rotor 3 or each rotor 3 comprises permanent magnets 12 and rotates around a median shaft while the stator or stators, advantageously two stators 1, 2, between them enclose a rotor 3 comprising windings 5.

FIG. 1 shows a rotor 3 bordered by two stators 1, 2, whereby the two stators 1, 2 enclose the at least one rotor 3 between them. This in no way restricts the possible configurations of the present invention. The motor or the generator is advantageously an axial flux motor or generator.

With reference to all the Figures, according to the invention, the rotor 3 or each rotor 3 comprises magnet structures 12 that form magnet poles, each magnet structure 12 being composed of a plurality of individual magnets 15.

That means that there are magnet structures 12 that form distinct magnet poles, although each magnet structure 12 comprises a plurality of individual magnets, one individual magnet of which is identified as 15 in FIG. 4, this individual magnet 15 being intended to represent each individual magnet. Therefore there can be a plurality of magnet structures 12, although these magnet structures 12 are not the same as the plurality of individual magnets 15 within the meaning of the present invention.

FIG. 1 shows an assembly of a rotor 3 and two stators 1 and 2. On a first stator, tapped borings 7 fixing each block 4 onto a disc-shaped support are visible.

Figure 2:
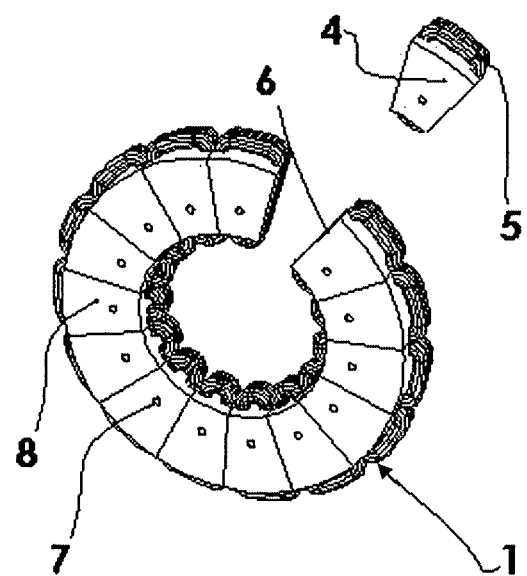
FIG. 2 is a schematic illustration of a perspective view of a stator which is part of an electromagnetic motor or generator according to one embodiment of the present invention, whereby a block with a quadrangular cross-section is shown at some distance from the rest of the stator, and whereby the stator has windings wound around the unit blocks that are independent of one another when they are not rigidly attached to each other.

FIG. 2 shows a stator with a block 4 separated from the other blocks. Only one block 4 per stator is identified as 4 in FIGS. 1 to 3 but what is specified for this block 4 also applies to all the other blocks shown in FIGS. 1 to 3. The same is true for a winding 5, a tapped boring, a lateral edge 6, a first face 8 and a notch 10.

The winding 5 is mounted on the block 4 before assembly, then placed in contact with the blocks 4 via their lateral edges 6 and held by fastening means of the type of a screw that runs through the tapped borings 7 or by adhesively bonding or welding the first faces 8 and/or respectively the second faces to one another, opposite to the first faces 8 and not visible in FIG. 2.

In FIG. 3, for the second stator 2, the winding is assembled directly in the magnetic circuit 9 via a notch 10, by passing the wire between the lateral edges in the thickness 11, 11' of two adjacent blocks 4. The notches 10 of two adjacent blocks 4 face one another and are complementary.

FIG. 4 shows the rotor 3 in an exploded view for a nonrestrictive embodiment with a rotor 3 comprising an armature 18. A single individual magnet or slug is identified as 15 in this FIG. 4, 12 being the identification number for an individual magnet structure comprising a multitude of individual magnets 15. Reference number 16 identifies a coating resin for an individual magnet 15 which also ensures its adhesive connection. The armature 18 comprises branches, only one of which is identified as 14, connecting a hub 19 to the binding band 13, the passage of the rotation shaft being identified as 20. Covering discs for the axial holding of the magnet structures 12 are identified as 17.

The individual magnets 15 can be in the shape of elongated slugs and have a length that extends depending on the thickness 11, 11' of the magnet structure 12. The elongated slug can be cylindrical or in the shape of a polyhedron with at least one flat longitudinal face oriented toward a work surface of the magnet structure 12 which is the surface facing the windings 5 in an electromagnetic motor or generator.

Each elongated slug has a magnetization line that extends approximately along its length, the individual magnets 15 being positioned in the magnet structure 12 at a distance from one another so that they are electrically isolated from one another.

The length of each slug can be greater than the diameter of the flat longitudinal face for a cylindrical slug or a longer diagonal connecting two apexes of this longitudinal face for a slug in the shape of a polyhedron. For a regular longitudinal face such as a hexagon, all the diagonals are equal. This can make it possible, for example, to insert each individual magnet 15 in the form of a slug in a respective space among the cavities of a honeycomb as the mesh structure to hold the individual magnets 15.

Moreover, a ratio of one surface of the longitudinal face of the slug to the total working surface of the magnet structure 12 can be less than, which shows that an individual magnet occupies very little space on the total working surface of the magnet structure 12. This makes it possible to have a very high number of slugs on the longitudinal face of the slug.

Each magnet structure 2 can form a self-contained unit by being coated in a layer of composite. It is possible that the magnet structure 12 can be in the form of a flat block with a polygonal surface in a plane radial to the median shaft.

In another embodiment, it is possible that there is only one magnet structure 12 concentric to the median shaft, designated the magnet superstructure 12, for example in the form of a ring, the superstructure being composed of magnet structures 12, each having a plurality of individual magnets 5, whereby the magnet structures 12 are individually coated, as is the magnet superstructure 12.

For an axial hold of the magnet structures 12, covering discs 17 can be arranged axially on each of the two opposite axial faces of the rotor 3. It is therefore not necessary to provide axial holding means for the magnet structures 12, for example by providing the branches 14 with axial holding means that cooperate with complementary axial holding means carried by the magnet structures 12, because the covering discs 17 perform this holding function.

The covering discs 17 can be made of composite material. The covering discs 17 and the magnet structures 12 can be coated in an outer coating layer of composite that defines the exterior contour of the at least one rotor 3. There can also be a plurality of coatings superimposed on one another, for example a coating of the individual magnets 15, advantageously with glue or adhesive and/or by means of a mesh structure made of a composite material, followed by a coating of each magnet structure 12 by an inner coating layer followed by an outer coating, if necessary with the armature 18 optionally provided with a binding band 13, branches 14 and a hub 19, by a layer of composite of the magnet structures 12 and the covering discs 17 together.

The stator or stators 1, 2 comprise concentric windings 5 with a series of blocks 4 with windings 5 wound around each block 4, whereby the blocks 4 are attached to one another. Windings 5 of this type are easy to fabricate.

As noted above, each magnet structure 12 forming a magnet pole can comprise more than twenty individual magnets 15, which shows that the individual magnets 15 are relatively small in relation to a magnet structure 2 and are not similar to a magnet structure 12. Without being restrictive, for a medium-size rotor 3 equipping a motor or generator according to the invention, the individual magnets 15 in the context of the present invention can have a dimension of 4 mm.

The individual magnets 15 can be connected to one another in a magnet structure 12 by a resin 16 that separates them while holding them or also so that they can each be inserted in a respective housing delimited by one of the respective housings of a composite mesh structure.

The magnet structure 12 can also include at least one mesh that has mesh elements, each delimiting a housing or cell for a respective individual magnet. Each housing can have inside dimensions that are just sufficient to allow the introduction of an individual magnet into its interior, while leaving a space between the housing and the individual magnet filled by a resin 16 reinforced by fibers, whereby the mesh structures are made of a fiber-reinforced insulating material, the space being kept as small as possible for a better framing of each individual magnet.

This makes it possible to ensure the holding of the individual magnets 15 in their respective housings even at a high speed of movement, for example a high speed of rotation for one or more of the magnet structures 12 that make up part of a rotor 3, although the invention is not limited to this configuration. The mesh can be in the form of a honeycomb, although the invention is not limited to this configuration.

As noted above, the magnet structures 12 can be individually coated in a layer of composite, advantageously a fiber-reinforced composite, in which case the magnet structures 12 are arranged directly adjacent to one another concentric to the median shaft of the at least one rotor 3.

In another embodiment, the magnet structures 12 can be arranged concentric to the median shaft while leaving a space between them which is filled by portions of the outer coating layer or also occupied by a branch 14 of an armature 18.

At least the outer coating layer and the covering discs 17 can be fiber-reinforced. That can be the case for each inner coating layer surrounding a magnet structure 12 individually.

The fibers of the outer coating layer and the fibers of the covering discs 17 can be advantageously oriented in different directions.

Without being limited to this design, a binding band 13 made of composite material advantageously surrounds the magnet structures 12 circumferentially on an exterior periphery of the at least one rotor 3, whereby the outer coating layer also coats the binding band 13. A radial hold of the magnet structures 12 is thereby ensured.

In one particular and optional embodiment, as illustrated in FIG. 4, the binding band 13 can be part of an armature 18 made of composite material comprising a hub 19 concentric to the median shaft. In this embodiment, branches 14 can extend between the hub 19 and the binding band 13, whereby each branch 14 separates two adjacent magnet structures 12 but does not have holding means for the magnet structure 12, which simplifies their design.

An axial hold of the magnet structures 12 or of the magnet superstructure 12 in the case of an individual magnet structure 12 is ensured by the covering discs 17. With regard to a radial hold of the magnet structures 12, the hold can be secondarily ensured by the binding band 13. As a general rule, it is the outer coating layer that performs the circumferential radial and axial holding of the magnet structures 12 or of the magnet superstructure 12.

The armature 18 can also be disc-shaped and partially hollowed out, comprising branches 14 that extend essentially radially or are inclined in the radial direction between an inner contour forming a hub 19, delimiting an interior passage 20 for a rotation shaft of the rotor 3, and the outer binding band 13 forming the outer ring of the armature 18.

The branches 14 can be inclined in relation to the rotation shaft of the rotor 3 as if they were screw blades and have a width that becomes greater the farther moving away from the center of the support.

In this embodiment, the armature 18 can be covered on at least one face by a covering disc 17 as axial holding means for the individual magnets 15 and the consolidation of the rotor 3. This can be done on the two opposite faces by a respective covering disc 17.

As shown in FIG. 2 in particular, the blocks 4 of a stator 1, 2 can each have first and second opposite surfaces 8 joined by a thickness 11, 11'. These first and second surfaces 8 can be quadrangular, with, for each surface, a rounded inner side closest to the shaft holding the rotor 3 that is smaller than a rounded outer side for each surface.

The first quadrangular surfaces 8 of the blocks 4 on one hand and the second quadrangular surfaces of the blocks 4 on the other hand can be aligned in a respective radio plane in the assembled position of the stator 1, 2 in the motor or the generator, whereby the windings 5 are wound around the thickness 11, 11' of each block 4. The blocks 4 can be made of iron or can contain iron.

Each of the blocks 4 can have first and second quadrangular surfaces 8 joined by a thickness 11, 11' as shown in FIG. 3bis. As shown in FIGS. 2 and 3, the first quadrangular surfaces 8 of the blocks 4 on one hand and the second quadrangular services of the blocks 4 on the other hand can be aligned in a respective radial plane in the assembled position of the at least one stator 1, 2 in the motor or generator.

The windings 5 can then be wound around the thickness 11, 11' of each block 4. The assembly forms a continuous ring, a block 4 being adjacent to two blocks divided over opposite sides of the block 4.

Therefore the first quadrangular surfaces 8 on one hand and the second quadrangular surfaces on the other hand are placed respectively end to end, whereby the blocks 4 form a ring concentric to the median shaft.

With reference to FIGS. 3 and 3bis, a notch 10 that extends in a radial plane can surround the thickness 11, 11' of each block 4 for the housing of the windings 5 around the block 4. This notch 10 can extend all the way around the block 4 in the median portion of its thickness 11, 11'. Each block 4 can be composed of a stack of metal sheets.

Two fastening modes for the blocks 4 can be used alternatively. In a first mode illustrated in FIGS. 1 and 2, each block 4 can have a median threaded boring 7 running through it, whereby a removable fastening means fastens each block 4 individually to a support ring applied against the blocks 4.

In a second mode, not illustrated in the Figures, each block 4 can be rigidly attached by permanent or removable fastening means to the two blocks 4 adjacent to it. This fastening can be done by gluing, by welding or by the use of mechanical fastening means.

The invention claimed is:

1. An electromagnetic motor or generator comprising:
at least one rotor (3) and at least one stator (1, 2),
said at least one rotor (3) comprising permanent magnets (12) in rotation around a median shaft, and
said at least one stator (1, 2) comprising windings (5),
characterized in that said at least one rotor (3) comprises magnet structures (12) forming magnet poles, each magnet structure (12) being composed of a plurality of individual magnets (15), whereby covering discs (17) are located axially on each of the two opposite axial faces of said at least one rotor (3), the covering discs

(17) being made of a composite material, the covering discs (17) and the magnet structures (12) being coated in an outer coating layer of composite material defining the outer contour of said at least one rotor (3), and in that the at least one stator (1, 2) comprises concentric windings (5) comprising a series of blocks (4) with the windings (5) wound around each block (4), the blocks (4) being rigidly attached to each other;

wherein the magnet structures (12) are individually coated in an internal composite layer in which the magnet structures (12) are arranged directly adjacent to one another concentric to the median shaft of the at least one rotor (3), or the magnet structures (12) are oriented concentric to the median shaft leaving a space between them filled by portions of the outer coating layer; and wherein the outer coating layer and the covering discs (17) are fiber-reinforced.

2. The motor or generator as recited in claim 1, in which each magnet structure (12) forming a magnetic pole advantageously comprises more than twenty individual magnets (15), the individual magnets (15) being connected by a resin (16) that separates them or are each inserted in a respective housing delimited by one of the mesh elements of a mesh.

3. The motor or generator of claim 2, in which the fibers of the outer coating layer and the fibers of the covering discs (17) are oriented in different directions.

4. The motor or generator of claim 1, in which the binding band (13) is part of an armature (18) made of composite material comprising a hub (19) concentric to the median shaft, branches (14) that extend between the hub (19) and the band (13), each branch (14) separating two adjacent magnet structures (12).

5. The motor or generator of claim 1 in which the blocks (4) or the at least one stator (1, 2) are made of iron.

6. The motor or generator of claim 5, in which the blocks (4) each have first and second quadrangular surfaces (8) joined by a thickness (11, 11'), the first quadrangular surfaces (8) of the blocks (4) on one hand and the second quadrangular surfaces of the blocks (4) on the other hand being aligned in a respective radial plane in the assembled position of the at least one stator (1, 2) in the motor or generator, the windings (5) being wound around the thickness (11, 11').

7. The motor or generator of claim 6 in which the first quadrangular surfaces (8) on one hand and the second quadrangular surfaces on the other hand are placed respectively end to end, the blocks (4) forming a ring concentric to the median shaft.

8. The motor or generator of claim 5, in which a notch (10) extending in a radial plane surrounds the thickness (11, 11') of each block (4) for the housing of the windings (5) around the block (4).

9. The motor or generator of claim 5, in which each block (4) is composed of a stack of metal sheets.

10. The motor or generator of claim 5, in which each block (4) has a median internal screw thread (7) running through it, a removable fastening means fastening each block (4) individually to a support ring applied against the blocks (4) or each block (4) is rigidly connected by permanent or removable fastening means to the two blocks (4) that are adjacent to it.

11. The motor or generator of claim 1, which includes at least one rotor (3) surrounded by two stators (1, 2), the two stators (1, 2) enclosing the at least one rotor (3) between them.

12. The motor or generator of claim 11 which is an axial flux motor or generator.

13. An electromagnetic motor or generator comprising:
at least one rotor (3) and at least one stator (1, 2),
said at least one rotor (3) comprising permanent magnets (12) in rotation around a median shaft, and
said at least one stator (1, 2) comprising windings (5),
characterized in that said at least one rotor (3) comprises magnet structures (12) forming magnet poles, each magnet structure (12) being composed of a plurality of individual magnets (15), whereby covering discs (17) are located axially on each of the two opposite axial faces of said at least one rotor (3), the covering discs (17) being made of a composite material, the covering discs (17) and the magnet structures (12) being coated in an outer coating layer of composite material defining the outer contour of said at least one rotor (3), and in that the at least one stator (1, 2) comprises concentric windings (5) comprising a series of blocks (4) with the windings (5) wound around each block (4), the blocks (4) being rigidly attached to each other;
wherein a binding band (13) made of composite material circumferentially surrounds the magnet structures (12) on an outer periphery of the at least one rotor (3), the outer coating layer also coating the band (13).

* * * * *